US012801531B2

(12) United States Patent
Kang

(10) Patent No.: US 12,801,531 B2
(45) Date of Patent: Nov. 17, 2026

(54) DATA SHARING METHOD OF MEMORY CONTROLLER

(71) Applicant: SAMSUNG ELECTRONICS CO., LTD., Suwon-si (KR)

(72) Inventor: Jonghoon Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/008,363

(22) Filed: Jan. 2, 2025

(65) Prior Publication Data

US 2025/0217300 A1 Jul. 3, 2025

(30) Foreign Application Priority Data

Jan. 2, 2024 (KR) ........................ 10-2024-0000549

(51) Int. Cl.

| | |
|---|---|
| ***G06F 12/00*** | (2006.01) |
| ***G06F 12/0895*** | (2016.01) |
| ***G06F 13/16*** | (2006.01) |
| ***G06F 13/18*** | (2006.01) |

(52) U.S. Cl.
CPC ...... *G06F 12/0895* (2013.01); *G06F 13/1642* (2013.01); *G06F 13/18* (2013.01)

(58) Field of Classification Search
CPC ... G06F 12/0895; G06F 13/1642; G06F 13/18
See application file for complete search history.

(56) References Cited

U.S. PATENT DOCUMENTS

| | | | | |
|---|---|---|---|---|
| 3,593,314 | A | 7/1971 | Moll | |
| 7,062,610 | B2 | 6/2006 | Conway | |
| 9,053,069 | B2 | 6/2015 | Brokenshire et al. | |
| 9,444,757 | B2 | 9/2016 | Pekcan et al. | |
| 10,055,807 | B2 | 8/2018 | Lee et al. | |
| 10,203,911 | B2 | 2/2019 | Lopez et al. | |
| 10,474,575 | B2 | 11/2019 | Beard et al. | |
| 10,620,954 | B2 | 4/2020 | Beard et al. | |
| 11,113,194 | B2 | 9/2021 | Dastidar et al. | |
| 11,175,854 | B2 | 11/2021 | Persson et al. | |
| 11,372,794 | B2 | 6/2022 | Ahn | |
| 2010/0192161 | A1* | 7/2010 | Eilebrecht | G06F 9/546 719/314 |

(Continued)

FOREIGN PATENT DOCUMENTS

WO 2018/189511 A1 10/2018

OTHER PUBLICATIONS

Communication issued Apr. 4, 2025 by the European Patent Office in European Patent Application No. 24223719.6.

(Continued)

*Primary Examiner* — Craig S Goldschmidt
(74) *Attorney, Agent, or Firm* — Sughrue Mion, PLLC

(57) ABSTRACT

A data sharing method of a memory controller in an environment including a plurality of operation devices, including: determining whether a request packet corresponds to a predetermined operation device; determining whether an address included in the request packet corresponds to a predetermined address; obtaining a tag line corresponding to the request packet; and determining whether the request packet is serviceable based on a service bit included in the tag line.

19 Claims, 9 Drawing Sheets

80

(56) References Cited

U.S. PATENT DOCUMENTS

| | | | | |
|---|---|---|---|---|
| 2013/0014118 | A1* | 1/2013 | Jones | G06F 9/544<br>718/104 |
| 2014/0208031 | A1 | 7/2014 | Raikin et al. | |
| 2016/0188474 | A1* | 6/2016 | Wang | G06F 12/0811<br>711/119 |
| 2017/0337295 | A1 | 11/2017 | Lopez et al. | |
| 2018/0293169 | A1* | 10/2018 | Beard | G06F 12/1054 |
| 2020/0026513 | A1* | 1/2020 | Akin | G06F 15/7821 |
| 2020/0167098 | A1 | 5/2020 | Shah et al. | |
| 2021/0073162 | A1 | 3/2021 | Ahn | |
| 2021/0075730 | A1* | 3/2021 | Palermo | H04L 47/6275 |

OTHER PUBLICATIONS

Communication issued Aug. 24, 2026 by the European Patent Office in European Patent Application No. 24 223 719.6-1207.

* cited by examiner

DATA SHARING METHOD OF MEMORY CONTROLLER

CROSS-REFERENCE TO RELATED APPLICATION

This application is based on and claims priority under 35 U.S.C. § 119 to Korean Patent Application No. 10-2024-0000549, filed on Jan. 2, 2024, in the Korean Intellectual Property Office, the disclosure of which is incorporated by reference herein in its entirety.

BACKGROUND

1. Field

The present disclosure relates to a data sharing method of a memory controller, and more particularly, to a source recognition memory controller for a data processing pipeline.

2. Description of the Related Art

Many recently released system-on-chips (SoCs) include processors or accelerators (e.g., a data processing unit (DPU), an image signal processor (ISP), and a neural processing unit (NPU). In these cases, it may be common to share data among multiple processors/accelerators on-chip and construct pipelines. Data processing typically may involve a producer that generates data and a consumer that post-processes the generated data. To ensure data consistency, memory copy and synchronization between the producer and consumer are beneficial. Software running on a host processor may be involved in memory copy and synchronization and may cause a significant stall in hardware. As a result, a significant amount of time (e.g., run-time) and resources (e.g., memory) may be wasted.

The above description is information acquired during the course of conceiving the present disclosure, or already possessed at the time, and is not necessarily publicly known before the filing of the present application.

SUMMARY

One or more embodiments may address at least the problems and/or disadvantages described above, and other disadvantages not described above. Also, the embodiments are not required to overcome and may not overcome any of the problems and disadvantages described above.

In accordance with an aspect of the disclosure, a data sharing method of a memory controller in an environment including a plurality of operation devices includes: determining whether a request packet corresponds to a predetermined operation device; determining whether an address included in the request packet corresponds to a predetermined address; obtaining a tag line corresponding to the request packet; and determining whether the request packet is serviceable based on a service bit included in the tag line.

The memory controller may include at least one of a dynamic random-access memory (DRAM) controller and a cache controller.

The data sharing method may further include: based on determining that the request packet is serviceable, updating the tag line.

The updating of the tag line may include, based on the request packet being a producer packet, updating the service bit of the tag line from a first value to a second value.

The updating of the tag line may include, based on the request packet being a consumer packet, updating the service bit of the tag line from a second value to a first value.

The determining of whether the request packet is serviceable may include, based on the request packet being a consumer packet, determining that the consumer packet is capable of reading data based on the service bit being a second value.

The data sharing method may further include: based on determining that the request packet is not serviceable, adding the request packet to a request queue of the memory controller.

The data sharing method may further include: based on a number of a plurality of producer packets being greater than or equal to a predetermined number in comparison with a number of a plurality of consumer packets, requesting a producer operation device corresponding to a producer packet from among the plurality of producer packets to reduce bandwidth.

The data sharing method may further include: based on a number of a plurality of consumer packets being greater than or equal to a predetermined number in comparison with a number of a plurality of producer packets, asking a consumer operation device corresponding to consumer packet from among the plurality of consumer packets to reduce bandwidth.

In accordance with an aspect of the disclosure, a non-transitory computer-readable storage medium storing instructions that, when executed by a processor, cause the processor to: determine whether a request packet corresponds to a predetermined operation device; determine whether an address included in the request packet corresponds to a predetermined address; obtain a tag line corresponding to the request packet; and determine whether the request packet is serviceable based on a service bit included in the tag line.

In accordance with an aspect of the disclosure, a memory controller includes: a request queue configured to store a plurality of request packets; a queue arbiter configured to determine priority information corresponding to the plurality of request packets based on at least one of producer operation device information, consumer operation device information, and address information corresponding to a shared buffer; and a tag memory configured to store a tag line including a service bit indicating whether a request packet from among the plurality of request packets is serviceable.

The memory controller may further include: at least one of a dynamic random-access memory (DRAM) controller and a cache controller.

The memory controller may further include a tag updater configured to update the tag line based on a determination that the request packet is serviceable.

The tag updater may be further configured to, based on the request packet being a producer packet, update the service bit of the tag line from a first value to a second value.

The tag updater may be further configured to, based on the request packet being a consumer packet, update the service bit of the tag line from a second value to a first value.

The tag updater may be further configured to, based on the request packet being a consumer packet, determine that the consumer packet is capable of reading data based on the service bit being a second value.

The tag updater may be further configured to, based on a determination that the request packet is not serviceable, input the request packet into the request queue.

Based on a number of a plurality of producer packets being greater than or equal to a predetermined number in comparison with a number of a plurality of consumer packets, the memory controller may be further configured to request a producer operation device corresponding to a producer packet from among the plurality of producer packets to reduce bandwidth.

Based on a number of a plurality of consumer packets being greater than or equal to a predetermined number in comparison with a number of a plurality of producer packets, the memory controller may be further configured to request a consumer operation device corresponding to a consumer packet from among the plurality of consumer packets to reduce bandwidth.

BRIEF DESCRIPTION OF THE DRAWINGS

The above and/or other aspects will be more apparent from descriptions of certain embodiments referring to the accompanying drawings, in which.

DETAILED DESCRIPTION

Figure 1:
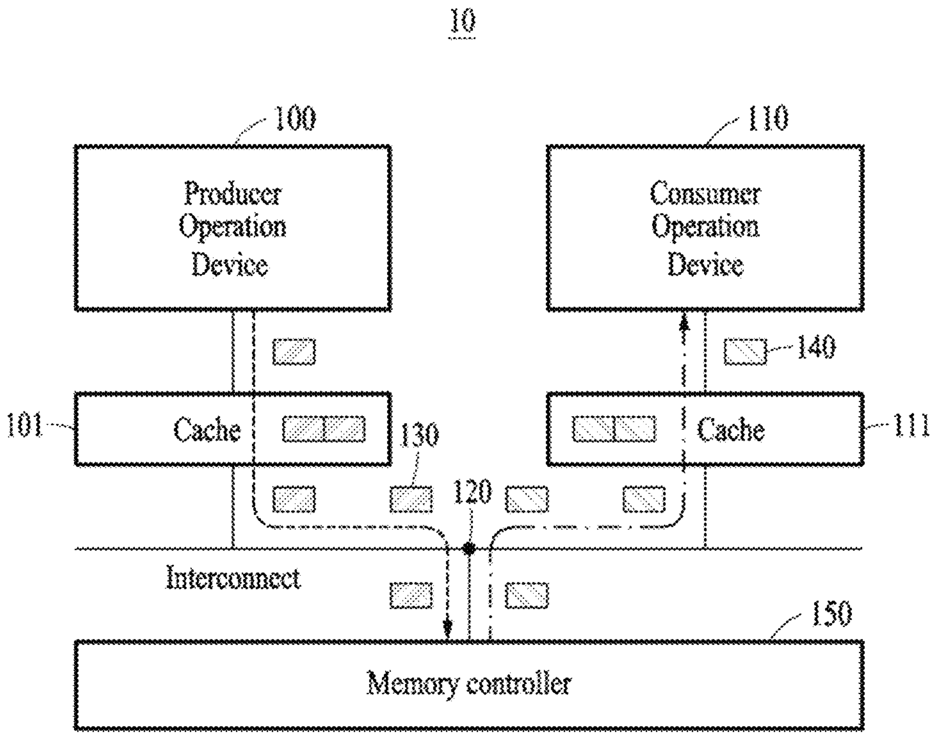
FIG. 1 is a diagram illustrating an operation of a system on a chip (SoC) according to an embodiment.

The following structural or functional descriptions are exemplary to merely describe some embodiments, and embodiments of the disclosure may be implemented in various forms. The described embodiments are not meant to be limiting, and it is intended that various modifications, equivalents, and alternatives are also covered within the scope of the disclosure.

Terms, such as first, second, and the like, may be used herein to describe components. Each of these terminologies is not used to define an essence, order or sequence of a corresponding component but used merely to distinguish the corresponding component from other components. For example, a "first" component may be referred to as a "second" component, or similarly, and the "second" component may be referred to as the "first" component within the scope of the right according to the concept of the present disclosure.

It should be noted that if one component is described as "connected", "coupled", or "joined" to another component, a third component may be "connected", "coupled", and "joined" between the first and second components, or the first component may be directly connected, coupled, or joined to the second component. However, if the first component is described as being "directly connected", "directly coupled", or "directly joined" to the second component, a third component may not be present between the first component and the second component. Expressions describing a relationship between components, for example, "between", directly between", or "directly neighboring", etc., should be interpreted to be alike.

The singular forms "a," "an," and "the" are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms used herein including technical or scientific terms have the same meaning as commonly understood by one of ordinary skill in the art to which this disclosure pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The embodiments may be implemented as various types of products, such as, for example, a personal computer (PC), a laptop computer, a tablet computer, a smartphone, a television (TV), a smart home appliance, an intelligent vehicle, a kiosk, and a wearable device. Hereinafter, embodiments are described in detail with reference to the accompanying drawings. In the drawings, like reference numerals are used to refer to like elements.

FIG. 1 is a diagram illustrating an operation of a system on a chip (SoC) according to an embodiment.

Referring to FIG. 1, an SoC 10 according to an embodiment may include a producer operation device 100, a consumer operation device 110, a point of serialization (POS) 120, and a memory controller 150.

The SoC 10 may include a plurality of processors or a plurality of accelerators (e.g., a data processing unit (DPU), an image signal processor (ISP), and a neural processing unit (NPU)). A processor and an accelerator included in the SoC 10 may be referred to as an operation device, a core, or an intellectual property (IP) core or IP block. In embodiments, an IP core or IP block may be a reusable unit of logic, cell, or integrated circuit layout design, but embodiments are not limited thereto. An operation device may include at least one of a producer operation device 100, which may be configured to generate data, and a consumer operation device 110, which may be configured to consume the data generated by the producer operation device 100. In embodiments some, a single operation device may be (or may act as) the producer operation device 100 when generating data, and may be (or may act as) the consumer operation device 110 when consuming data, however embodiments are not limited thereto.

The producer operation device 100 may be a processor or an accelerator that is responsible for generating data in data processing (e.g., a chain and a pipeline) of the SoC 10. The producer operation device 100 may execute driver software that manages the producer operation device 100, may generate data, and may enable the consumer operation device 110 to consume the generated data. The producer operation device 100 may write data up to a first controller, which may be the POS 120, by which the producer operation device 100 may interface with the consumer operation device 110.

The consumer operation device 110 may be a processor or an accelerator that is responsible for consuming data in data processing. The consumer operation device 110 may execute driver software that manages the consumer operation device 110 and may play a role in reading and processing the data generated by the producer operation device 100. The consumer operation device 110 may transmit a read request to the POS 120 with the producer operation device 100. Although FIG. 1 shows only one consumer operation device 110, embodiments are not limited thereto. For example, in some embodiments, the SoC 10 may include more than one consumer operation device 110.

The POS 120 may be a point at which traffic generated by the producer operation device 100 and the consumer operation device 110 is serialized. The POS 120 may include the memory controller 150 and a top-level interconnect by which the producer operation device 100 and the consumer operation device 110 may share data.

Write data 130 generated by the producer operation device 100 may be propagated to a source-aware memory controller (e.g., the memory controller 150) included in the POS 120. The write data 130 may be flushed from a local cache 101 corresponding to the producer operation device 100. In some embodiments, the SoC 10 may not include the local cache 101, and the write data 130 may reach the POS 120 directly.

Read data 140 may be data read by the consumer operation device 110 from the memory controller 150 at the POS 120. The read data 140 may be stored in a local cache 111 corresponding to the consumer operation device 110. In some embodiments, the SoC 10 may not include the cache 111, and the read data 140 may be directly input into an operation device.

The memory controller 150 may recognize traffic generated by the producer operation device 100 and the consumer operation device 110 according to a predetermined configuration, and may play a role in completing a producer-consumer chain using at least one of a recognized result, target address information, and tag information of the traffic.

As described above, in some implementations of an SoC, memory copy and synchronization may be performed between the producer operation device 100 and the consumer operation device 110 for data consistency. Software running on a host processor is involved in memory copy and synchronization and may cause a significant stall in hardware. As a result, a significant amount of time (e.g., runtime) and resources (e.g., memory) may be wasted.

Some implementations of an SoC may use a software or hardware technique to reduce host processor intervention. The hardware technique may be used, for example, to create a dedicated path between operation devices such that a producer operation device and a consumer operation device may operate simultaneously.

The software technique may be used, for example, when memory allocation is performed, to distinguish between a producer operation device and a consumer operation device and to add, to the producer operation device and the consumer operation device, a link indicating that the producer operation device and the consumer operation device are virtually connected to each other such that hardware may support the connection.

However, these approaches may encounter an issue in which the order in which a producer operation device operates and an order in which the consumer operation device operates may be aligned with each other, leading to the unavoidable intervention of a host processor (e.g., governor software). When a predetermined data size and a buffer are used, new synchronization may be required. An operation device that does not support synchronization may need to undergo additional development to support synchronization. The software technique may only apply to a processor, and may not be used by an accelerator.

Embodiments of the present disclosure relate to a method that may eliminate the issues described above. When sharing data, the use of memory or cache is inevitable. Thus, the memory controller 150 (or for example a cache controller) may have a configurable register that may recognize a source (e.g., the producer operation device 100 or the consumer operation device 110), and data sharing may be performed between operation devices in the memory controller 150. When this data sharing is performed, the memory controller 150 may perform order scheduling for data processing between the producer operation device 100 and the consumer operation device 110.

When a configuration (e.g., information about at least one of a producer operation device IP information, consumer operation device IP information, a shared buffer start address, shared buffer size offset, and a start/end trigger) is applied to the memory controller 150, consistency among operation devices in the memory controller 150 may be achieved.

When the configuration is completed in the memory controller 150 and software that manages a producer operation device and/or a consumer operation device is executed, each software and hardware component may be set up to perform a data processing pipeline without awareness of the existence of data sharing.

According some embodiments, data sharing may be possible in a circular queue format for a buffer through a single configuration of the producer operation device 100 and a single configuration of the consumer operation device 110 until an application terminates. Furthermore, a modification of the memory controller 150 of the POS 120 may accelerate all operation devices. This may help reduce the effort involved in creating a new SoC design. Moreover, host processor intervention may be completely eliminated, except for the initial execution of an application.

Figure 2:
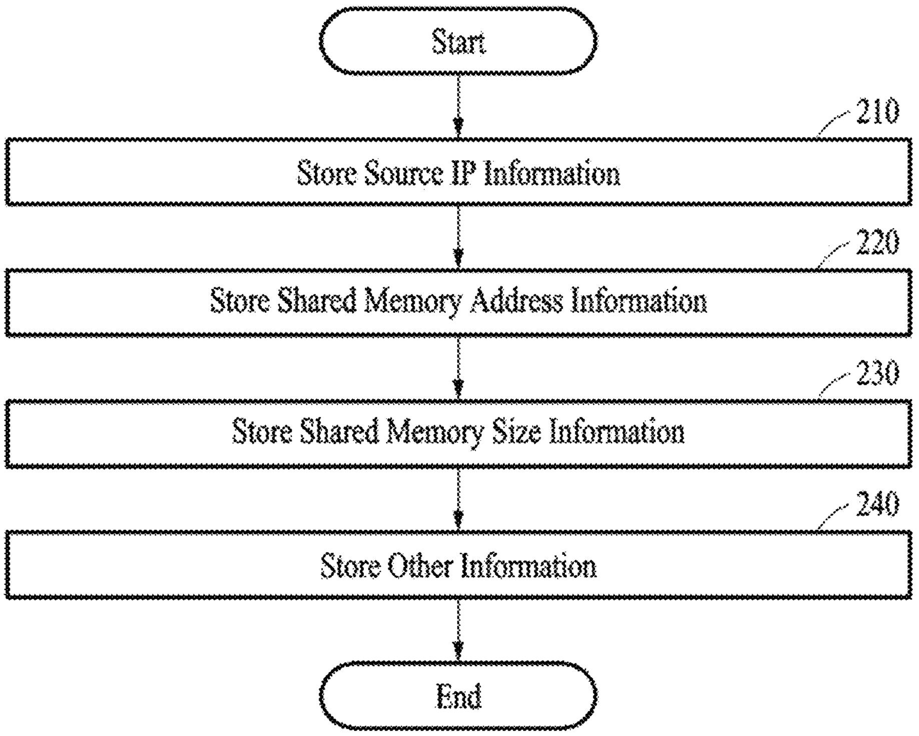
FIG. 2 is a flowchart illustrating a configuration method according to an embodiment.

FIG. 2 is a flowchart illustrating a configuration method according to an embodiment. The description provided with reference to FIG. 1 may also apply to FIG. 2. Operations of FIG. 2 may be performed in the order and manner shown in FIG. 2, but embodiments are not limited thereto. For example, the order of some operations may change or some operations may be omitted, without departing from the spirit and scope of the shown embodiment. In some embodiments, the operations shown in FIG. 2 may be performed in parallel or simultaneously.

Referring to FIG. 2, a host processor may perform configuration of the memory controller 150. The host processor may store predetermined information in a configuration register of the memory controller 150 through the configuration.

At operation 210, the host processor may store source IP information (e.g., producer operation device IP information and consumer operation device IP information) in the memory controller 150. In embodiments, this may be referred to as configuring the source IP information.

At operation 220, the host processor may store shared memory address information (e.g., a shared buffer start address and shared buffer size offset) in the memory controller 150. In embodiments, this may be referred to as configuring a base address and an address size corresponding to the shared memory information.

At operation 230, the host processor may store shared memory size information (e.g., a shared buffer size offset) in the memory controller 150. In embodiments, this may be referred to as configuring an address size corresponding to the shared memory information.

At operation 240, the host processor may store other information (e.g., information about at least one of a shared start trigger and a shared end trigger) in the memory controller 150. In embodiments, this may be referred to as configuring a start/end trigger corresponding to the shared memory information.

Figure 3:
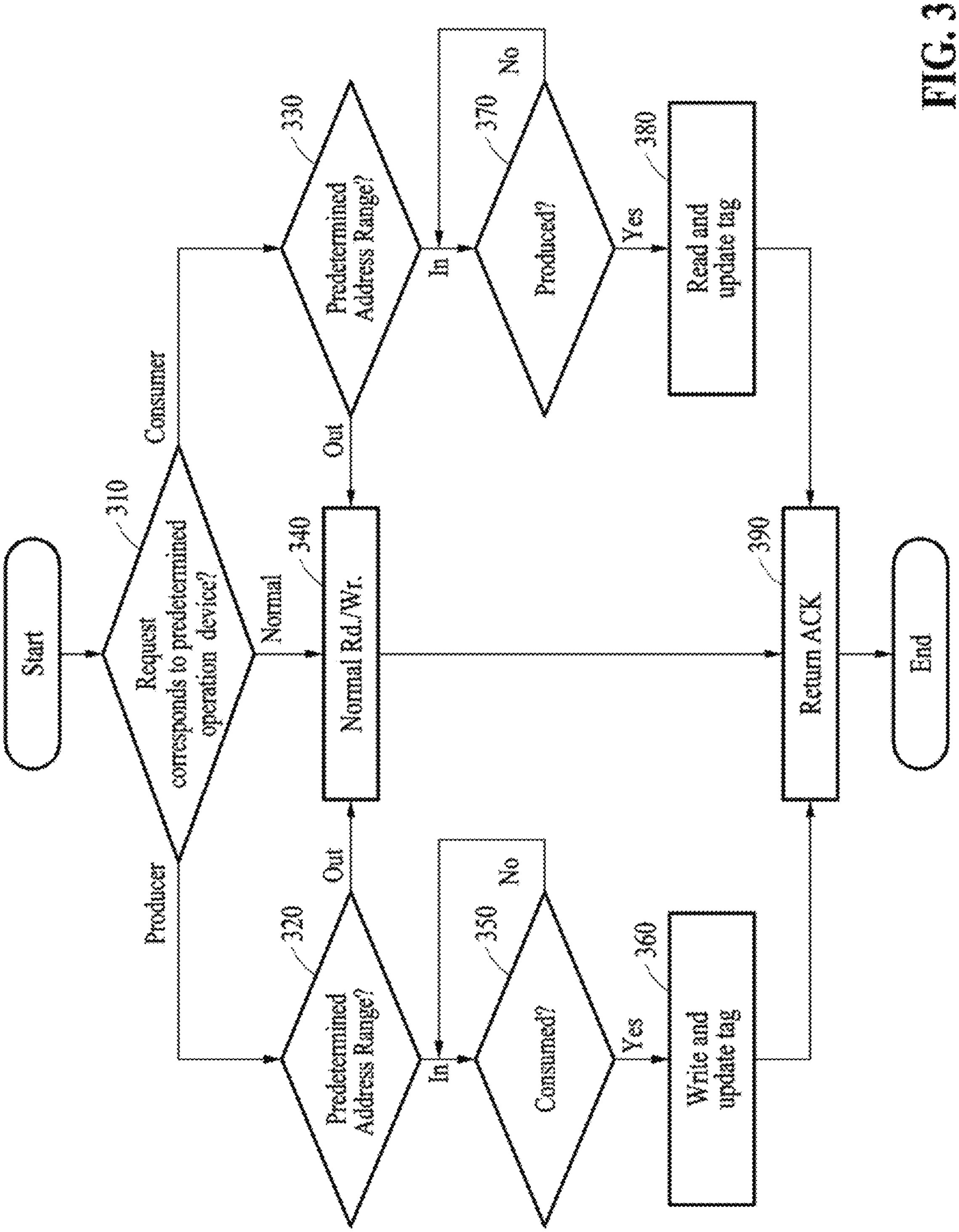
FIG. 3 is a flowchart illustrating an operation of a memory controller according to an embodiment.

FIG. 3 is a flowchart illustrating an operation of the memory controller 150 according to an embodiment. The description provided with reference to FIGS. 1 and 2 may also apply to FIG. 3. Operations of FIG. 3 may be performed in the order and manner illustrated in FIG. 3, but embodiments are not limited thereto. For example, the order of some operations may change or some of the operations may be omitted, without departing from the spirit and scope of the shown embodiment. In some embodiments, the operations shown in FIG. 3 may be performed in parallel or simultaneously.

At operation 310, the memory controller 150 may determine whether a request packet corresponds to a predetermined operation device (e.g., whether the packet is the producer operation device 100 or the consumer operation device 110). The memory controller 150 may determine whether the request packet corresponds to the predetermined operation device based on source IP information stored through configuration.

At operation 320, the memory controller 150 may determine whether an address included in the request packet corresponds to a predetermined address based on the determination that the request packet corresponds to the producer operation device 100. The memory controller 150 may determine whether the address included in the request packet corresponds to the predetermined address based on the shared memory information stored through configuration.

At operation 330, the memory controller 150 may determine whether the address included in the request packet corresponds to the predetermined address based on the determination that the request packet corresponds to the consumer operation device 110. The memory controller 150 may determine whether the address included in the request packet corresponds to the predetermined address based on the shared memory information stored through configuration.

At operation 340, based on determining that the request packet does not correspond to the predetermined operation device, or that address included in the request packet does not correspond to the predetermined address, it may be determined that the request packet may correspond to a normal transaction unrelated to a shared memory.

At operation 350, the memory controller 150 may determine whether the request packet is serviceable, which may mean that the request packet is in a serviceable state. For example, when the producer operation device 100 writes data into a buffer, the memory controller 150 may determine whether the data is already acquired or consumed by the consumer operation device 110.

At operation 360, based on determining that the request packet is in a serviceable state, the memory controller 150 may write data and update a tag line. Examples of a tag and a tag line according to an embodiment are described below in detail with reference to FIG. 4.

At operation 370, the memory controller 150 may determine whether the request packet is serviceable, which may mean that the request packet is in a serviceable state. For example, the memory controller 150 may determine whether the producer operation device 100 has produced or written the data.

At operation 380, based on the determination that the request packet is in a serviceable state, the memory controller 150 may read data and update a tag line.

At operation 390, the memory controller 150 may transmit a response or acknowledgement (illustrated as "ACK") to indicate completion of a corresponding task.

Figure 4:
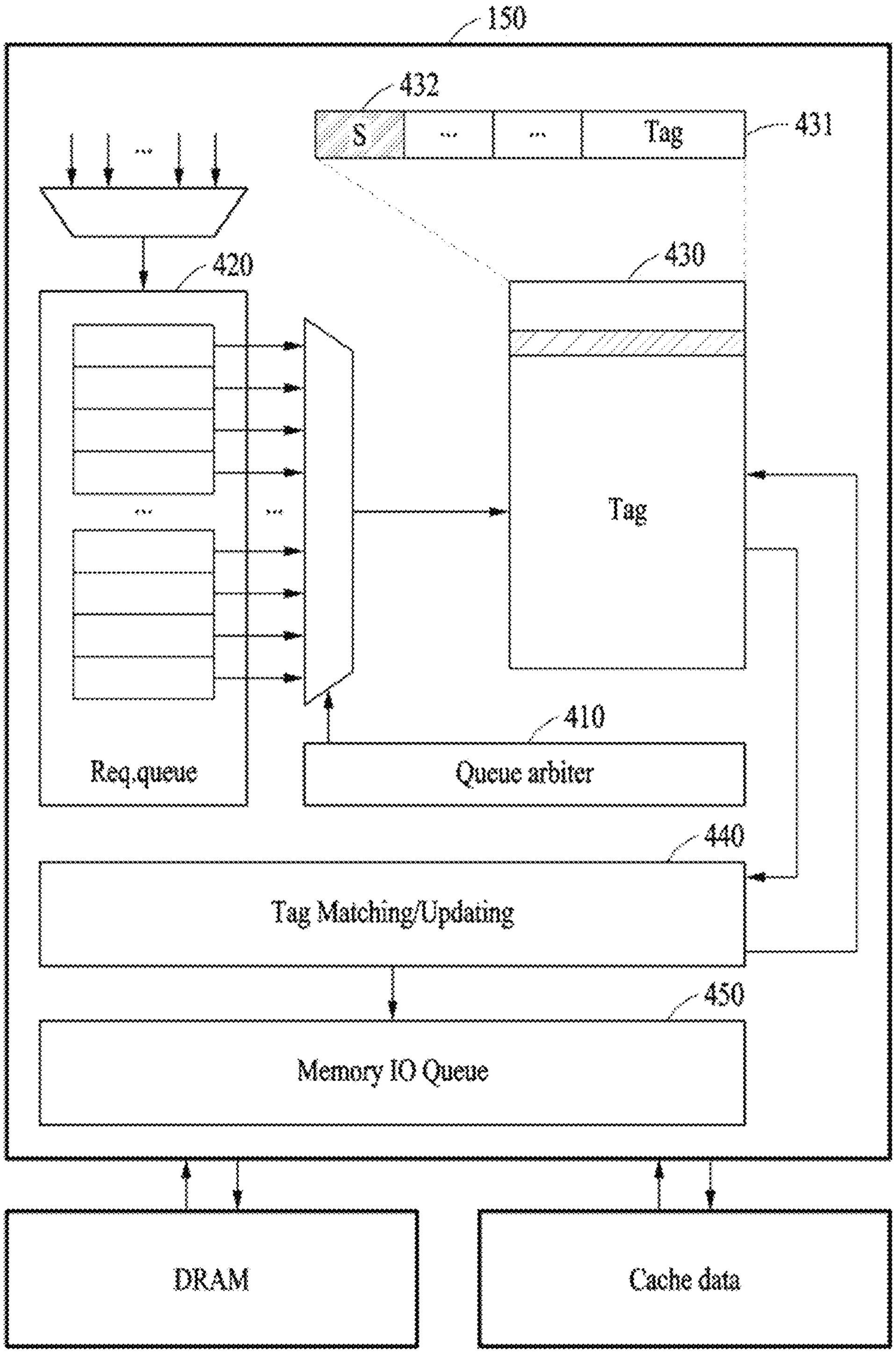
FIG. 4 is a block diagram of a memory controller according to an embodiment.

FIG. 4 is a block diagram of a memory controller according to an embodiment. The description provided with reference to FIGS. 1 to 3 may also apply to FIG. 4.

Referring to FIG. 4, the memory controller 150 may include a queue arbiter 410, a request queue 420, a tag 430, a tag matching updating module 440, which may be referred to as a tag updater, and a memory input/output (I/O) queue 450. However, embodiments are not limited thereto. For example, in some embodiments the memory controller 150 may be implemented by more or less components than the components illustrated in FIG. 4.

The queue arbiter 410 may determine the order to service requests input into the request queue 420 based on priority. In some embodiments, tag lookup or memory access may include elements such as quality-of-service (QoS), read/write balance, timeout, and channel. Source IP information (e.g., at least one of IP block information about the producer operation device 100 and IP block information about the consumer operation device 110), shared memory information (e.g., a shared buffer start address and shared buffer size offset), and operation order information may be added to the queue arbiter 410.

The request queue 420 may be used to store memory input/output (I/O) request packets, which may be requested by multiple operation devices. In embodiments, the request queue 420 may have a predetermined depth. The request queue 420 may be implemented as a single merged queue or a segregated queue, such as a read/write queue or a read/write/producer/consumer queue, as needed. The memory controller 150 may select a packet to transmit a request to the tag 430, based on the request queue 420 and the queue arbiter 410.

The tag 430 may be a memory (e.g., static random-access memory (SRAM)) that contains tag information. The tag 430 may be similar to a tag used in a general cache. The tag 430 may include a tag line 431. The tag line 431 may be information contained in the tag 430. Based on the request queue 420, and the queue arbiter 410 may determine to perform a lookup operation for a packet using the tag 430 based on an address or a hash. The tag line 431 read or otherwise obtained as the result of the lookup operation may be either one tag line or multiple tag lines based on a set-associative structure.

The tag line 431 may include information indicating whether an operation device is serviceable in addition to tag line information (e.g., address, valid, dirty, etc.) contained in a general cache. This information may be referred to as a service bit 432.

The tag matching updating module 440 may update a tag line e.g., the tag line 431) based on read tag information, or may determine whether the memory controller 150 operates according to cache access or dynamic RAM (DRAM) access. Based on the memory controller 150 being a cache controller, the memory controller 150 may operate according to cache access. Based on the memory controller 150 being a DRAM controller, the memory controller 150 may operate according to DRAM access.

When a plurality of consumer operation devices (which may be referred to as multi-consumer mode) is provided, the tag matching updating module 440 may support a multi-consumer mode by updating a service bit of the tag line 431. For example, based on a producer operation device 100 using multicast communication with five consumer operation devices 110, a service bit may show or otherwise indicate the number five or "5". Thereafter, each time one consumer operation device 110 accesses an address region, the tag matching updating module 440 may reduce the service bit by one or "1". However, a method of implementing and updating a service bit is not limited to the examples described above, and various methods may be adopted.

Figure 5:
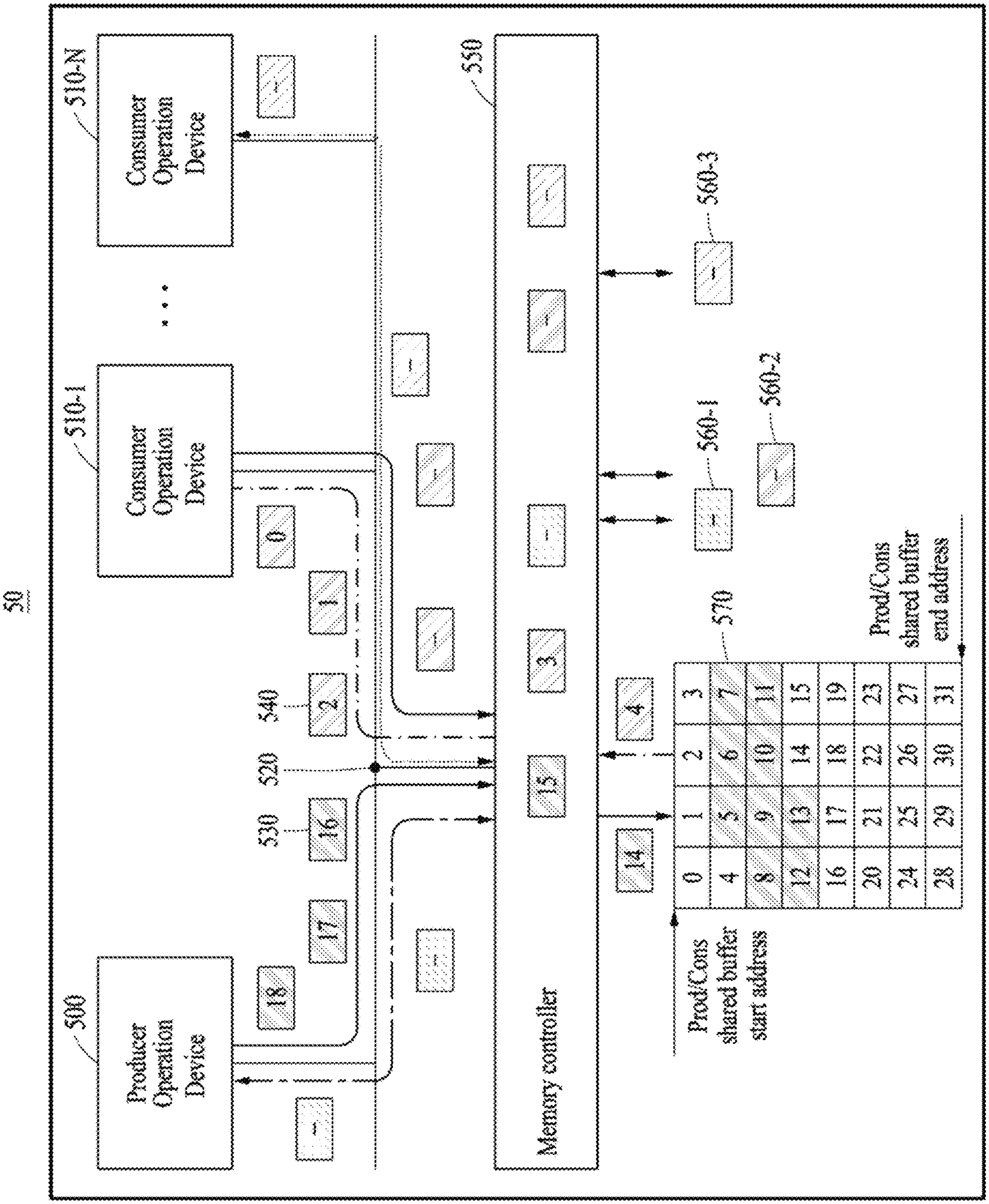
FIG. 5 is a diagram illustrating a method of sharing data between operation devices, according to an embodiment.

FIG. 5 is a diagram illustrating a method of sharing data between operation devices, according to an embodiment. The description provided with reference to FIGS. 1 to 4 may also apply to FIG. 5.

Referring to FIG. 5, an SoC 50 may include a producer operation device 500, consumer operation devices 510-1 to 510-N, a POS 520, a memory controller 550, and a shared memory 570. In some embodiments, the producer operation device 500 may correspond to the producer operation device 100, the consumer operation devices 510-1 to 510-N may correspond to the consumer operation device 110, the POS 520 may correspond to the POS 120, and the memory controller 550 may correspond to the memory controller 150, but embodiments are not limited thereto.

The producer operation device 500 may generate a producer packet 530. The producer packet 540 may be mapped to a transaction size, a DRAM access size, or a cache line size supported by the shared memory 570.

The consumer operation device 510-1 may generate a consumer packet 540. A size of the consumer packet 540 may be the same as a size of the producer packet 530. Similarly, the consumer packet 540 may be mapped to the transaction size, DRAM access size, or cache line size supported by the shared memory 570.

The shared memory 570 may be a shared buffer. The shared memory 570 may be a memory space set by a host and may be a virtual address-based buffer or a physical address-based buffer according to the hierarchy of the POS point 520. The production order and consumption of the shared buffer may be synchronized with each other in units of transaction size, DRAM access size, or cache line size of an interconnect to which the memory controller 550 is connected and may be managed internally.

For example, fine-grain division of the transaction order between the producer operation device 500 and the consumer operation device 510-1 may allow for minimizing the idle time of each IP block, enabling rapid data sharing. However, the size or configuration of the shared buffer may be limited due to the constraints imposed by a tag memory of the memory controller 550 or memory region management.

The memory controller 550 may receive general transactions 560-1 to 560-3. The producer operation device 500 may request the general transaction 560-1 in addition to a transaction (e.g., the producer packet 530) that writes data into the shared memory 570. The consumer operation device 510-1 may request the general transaction 560-2 in addition to a transaction (e.g., the consumer packet 540) involving reading data into the shared memory 530. Operation devices (e.g., consumer operation devices 510-2 to 510-N) other than the producer operation device 500 and the consumer operation device 510-1 may also request the general transaction 560-3.

When writing the producer packet 530 into the shared memory 570, the memory controller 150 may change a service bit included in a tag line corresponding to the producer packet 530 from a first value (e.g., zero or "0") to a second value (e.g., one or "1"). When receiving the consumer packet 540, the memory controller 550 may determine that the consumer packet 540 may be in a state of being capable of reading data when a service bit included in a tag line corresponding to the consumer packet 540 is the second value (e.g., one or "1"). When reading the consumer packet 540 from the shared memory 570, the memory controller 150 may change a service bit included in a tag line corresponding to the consumer packet 540 from the second value (e.g., one or "1") to the first value (e.g., zero or "0").

According to the example shown in FIG. 5, the shared memory 570 may include a space that may store 32 pieces of data, ranging from data #0 to data #31. The producer operation device 500 may generate a producer packet corresponding to data #0 to data #18, data #0 to data #13 may be written into the shared memory 530, and data #14 to data #18 may not be written into the shared memory 530 yet.

When pieces of data, ranging from data #0 to data #13, are written, service bits of the pieces of data may be changed from the first value (e.g., zero or "0") to the second value (e.g., one or "1"). Data #0 to data #4 may be written into the shared memory 570 before read by the consumer operation device 510-1. Accordingly, the service bit included in the tag line may be changed back to the first value (e.g., zero or "0") from the second value (e.g., one or "1"). Thus, in FIG. 5, only data #5 to data #13 may have service bits with the second value (e.g., one or "1").

Figure 6:
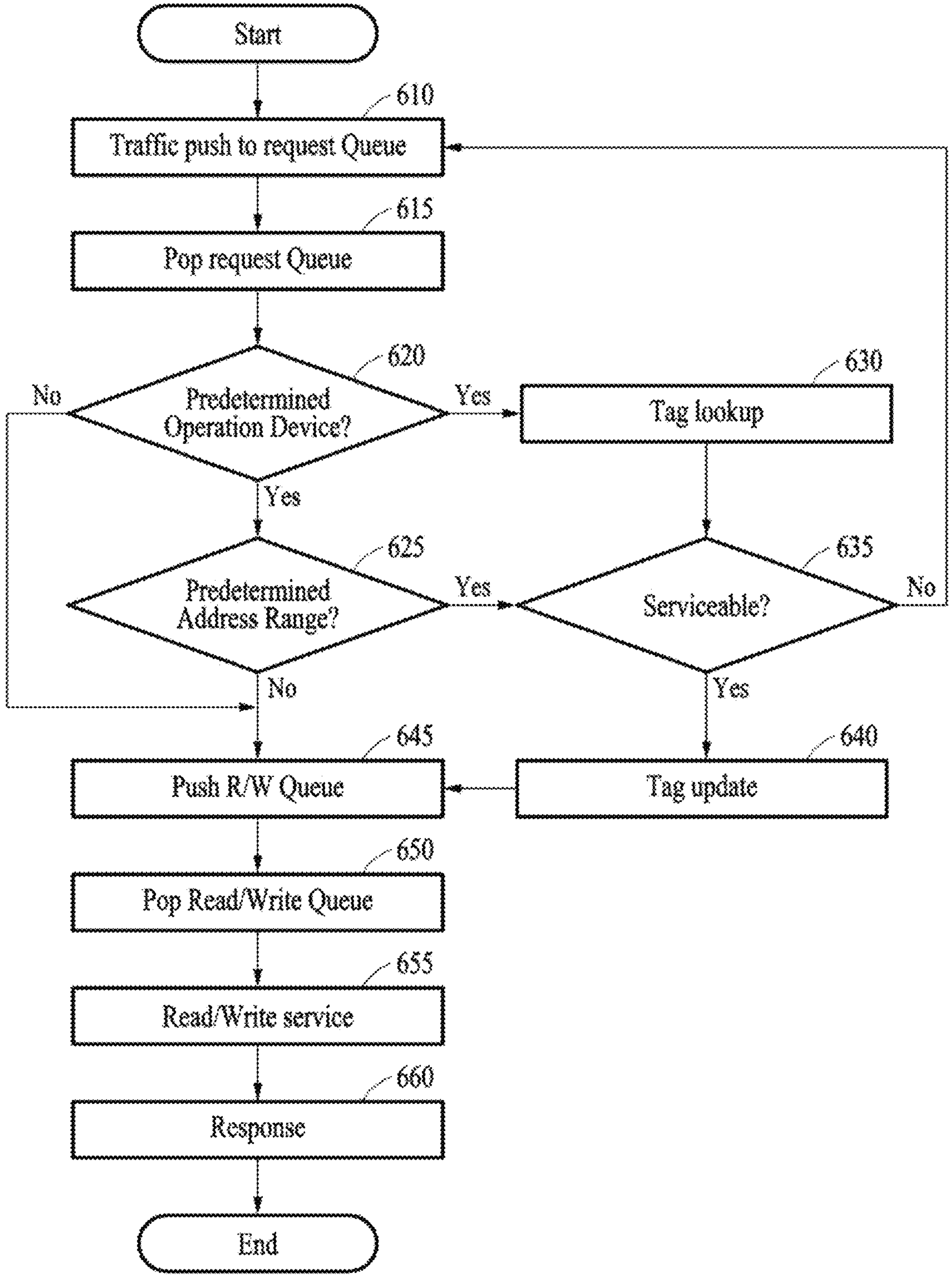
FIG. 6 is a diagram illustrating an operation of a memory controller according to an embodiment.

FIG. 6 is a diagram illustrating an operation of a memory controller according to an embodiment. The description provided with reference to FIGS. 1 to 5 may also apply to FIG. 6.

Referring to FIG. 6, the memory controller 550 may be operate as a DRAM controller. Operations of FIG. 6 may be performed in the order and manner illustrated in FIG. 6, but embodiments are not limited thereto. For example, the order of some of the operations may change or some of the operations may be omitted, without departing from the spirit and scope of the illustrated embodiment. In some embodiments, operations illustrated in FIG. 6 may be performed in parallel or simultaneously.

The memory controller 550 may push traffic to a request queue (e.g., the request queue 420 of FIG. 4) at operation 610 and may pop the request queue at operation 615. In embodiments, to "pop" a queue may mean to remove an element from the front of the queue (e.g., to remove the oldest element in the queue).

At operation 620, the memory controller 550 may determine whether a request packet corresponds to a predetermined operation device. At operation 625, based on the determination that the request packet corresponds to the predetermined operation device, the memory controller 550 may determine whether an address included in the request packet corresponds to a predetermined address.

At operation 630, based on the determination that the address included in the request packet corresponds to the preset address, the DRAM controller may look up or otherwise obtain a tag line corresponding to the request packet. At operation 635, based on a service bit included in a tag line, the memory controller 550 may determine whether the request packet is in a serviceable state.

For example, the memory controller 550 may determine whether the request packet is in a serviceable state by determining whether corresponding data is already acquired by a consumer operation device 510 when a producer operation device 500 performs buffer writing. As another example, the memory controller 550 may determine whether the request packet is in a serviceable state by determining whether the producer operation device 500 uploads the corresponding data. When the request packet is in an unserviceable state, the request packet may be placed back into the request queue and the determination of the serviceability of the request packet may be revisited later.

At operation 640, based on the determination that the request packet is in a serviceable state, the memory controller 550 may update a tag. At operation 645, a cache controller may push a read/write queue. In some embodiments, at operation 645, based on the determination that the address included in the request packet does not correspond to the predetermined address, the cache controller may push the read/write queue. At operation 650, the memory controller 550 may pop the read/write queue.

The memory controller 550 may provide a read/write service at operation 655 and may transmit a response or acknowledgement to indicate completion of a corresponding task at operation 660.

Figure 7:
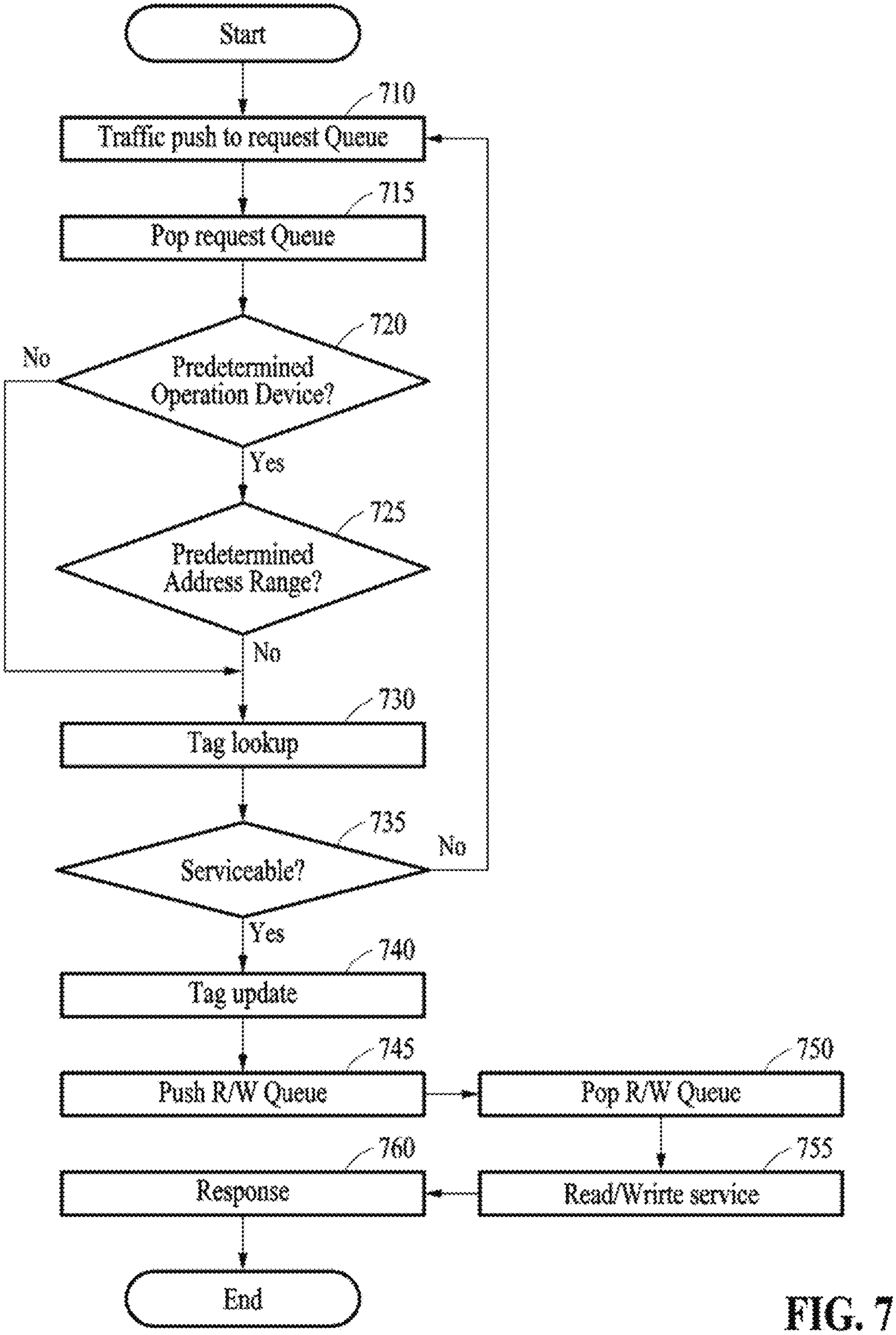
FIG. 7 is a diagram illustrating an operation of a memory controller according to an embodiment.

FIG. 7 is a diagram illustrating an operation of a memory controller according to an embodiment. The description provided with reference to FIGS. 1 to 5 may also apply to FIG. 7.

Referring to FIG. 7, the memory controller 550 may operate as a cache controller. Operations of FIG. 7 may be performed in the order and manner illustrated in FIG. 7, but embodiments are not limited thereto. For example, the order of some of the operations may change or some of the operations may be omitted, without departing from the spirit and scope of the illustrated embodiment. In some embodiments operations illustrated in FIG. 7 may be performed in parallel or simultaneously.

The memory controller 550 may push traffic to a request queue (e.g., the request queue 420 of FIG. 4) at operation 710 and may pop the request queue at operation 715.

At operation 720, the memory controller 550 may determine whether a request packet corresponds to a predetermined operation device. At operation 725, based on the determination that the request packet corresponds to the predetermined operation device, the memory controller 550 may determine whether an address included in the request packet corresponds to a predetermined address.

At operation 730, based on the determination that the address included in the request packet corresponds to the predetermined address, the memory controller 550 may look up or otherwise obtain a tag line corresponding to the request packet. At operation 735, based on a service bit included in the tag line, the memory controller 550 may determine whether the request packet is in a serviceable state.

For example, similar to FIG. 6, the memory controller 550 may determine whether the request packet is in a serviceable state by determining whether corresponding data is already acquired by a consumer operation device 510 when a producer operation device 500 performs buffer writing. In As another example, the memory controller 550 may determine whether the request packet is in a serviceable state by determining whether the producer operation device 500 uploads the corresponding data. When the request packet is in an unserviceable state, the request packet may be placed back into the request queue and the determination of the serviceability of the request packet may be revisited later.

At operation 740, based on the determination that the request packet is in a serviceable state, the memory controller 550 may update a tag. At operation 745, the memory controller 550 may push a read/write queue, and at operation 750, the DRAM controller may pop the read/write queue.

The memory controller 550 may provide a read/write service at operation 755 and may transmit a response or acknowledgement to indicate completion of a corresponding task at operation 760.

Figure 8:
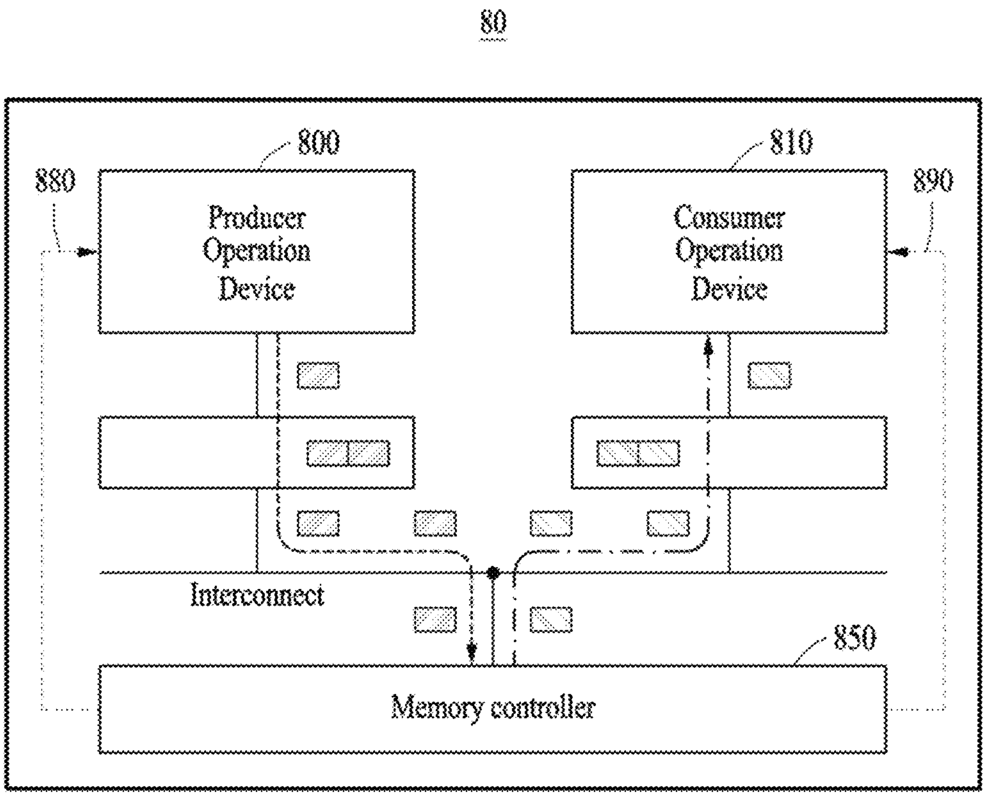
FIG. 8 is a diagram illustrating a data congestion processing method according to an embodiment.

FIG. 8 is a diagram illustrating a data congestion processing method according to an embodiment. The description provided with reference to FIGS. 1 to 7 may also apply to FIG. 8.

Referring to FIG. 8, an SoC 80 may include a producer operation device 800, a consumer operation device 810, and a memory controller 850. In some embodiments, the producer operation device 800 may correspond to the producer operation device 100, the consumer operation device 810 may correspond to the consumer operation device 110, and the memory controller 850 may correspond to the memory controller 150, but embodiments are not limited thereto.

Referring to FIG. 8, when data congestion is caused by the producer operation device 800 and/or the consumer operation device 810, the memory controller 850 may apply backpressure to the producer operation device 800 and/or the consumer operation device 810 and request the producer operation device 800 and/or the consumer operation device 810 to reduce bandwidth.

For example, a first path 880 (e.g., a backpressure wire) may be connected between the memory controller 850 and the producer operation device 800, and a second path 890 (e.g., a backpressure wire) may be connected between the memory controller 850 and the consumer operation device 810.

The memory controller 850 may determine whether a data bandwidth mismatch occurs between the producer operation device 800 and the consumer operation device 810. For example, the memory controller 850 may determine whether the mismatch occurs by comparing the number of producer packets with the number of consumer packets.

Based on the producer operation device 800 generating data too quickly, leading to a full tag capacity (e.g., when the number of producer packets is greater than or equal to a predetermined number in comparison with the number of consumer packets), the memory controller 850 may apply backpressure to the producer operation device 800, and may speed up the consumer drain rate of the consumer operation device 810.

When the consumer operation device 810 drains too early (e.g., when the number of consumer packets is greater than or equal to a predetermined number in comparison with the number of producer packets), the capacity of a pending request queue may be full, decreasing the performance of other IP blocks. Thus, the memory controller 850 may apply backpressure to the consumer operation device 810, and may request the consumer operation device 810 to slow down the consumer drain rate, and may prioritize a write transaction of the producer operation device 800.

Figure 9:
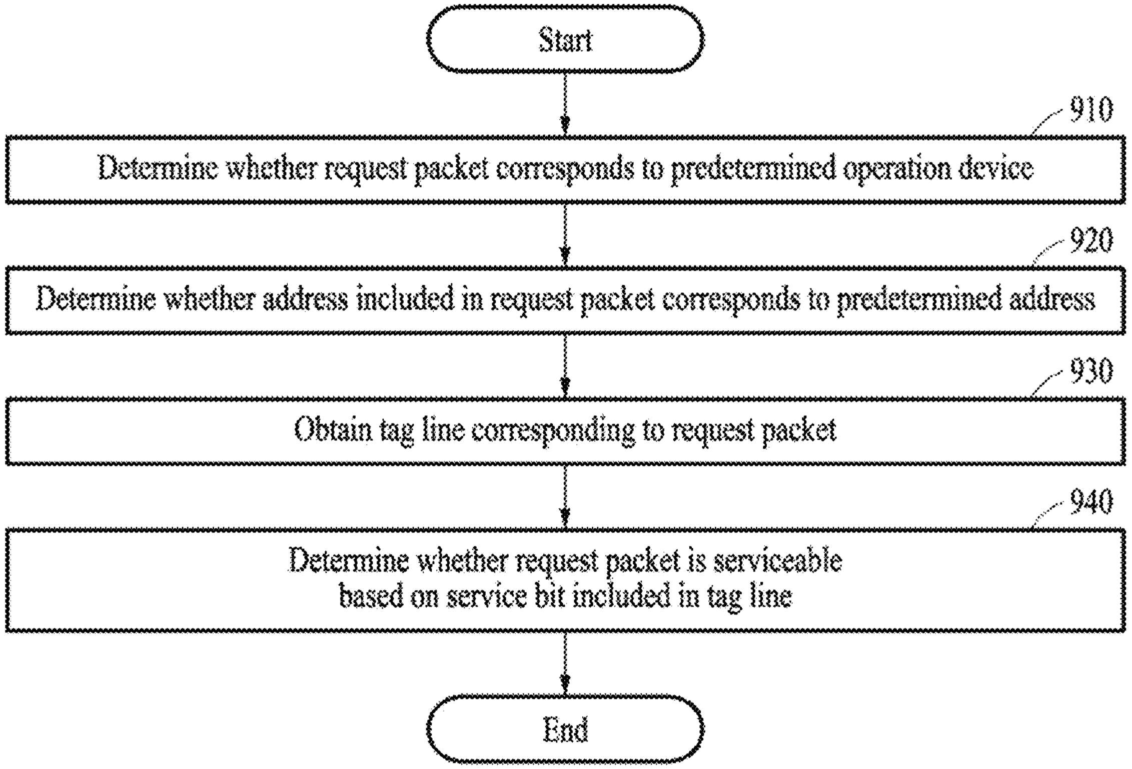
FIG. 9 is a flowchart illustrating a data sharing method according to an embodiment.

FIG. 9 is a flowchart illustrating a data sharing method according to an embodiment. The description provided with reference to FIGS. 1 to 8 may also apply to FIG. 9.

For ease of description, operations 910 to 940 are described as being performed using the memory controller 150 illustrated in FIG. 1. However, operations 910 to 940 may be performed by any suitable electronic device and in any suitable system.

Furthermore, the operations of FIG. 9 may be performed in the order and manner illustrated in FIG. 9, but embodiments are not limited thereto. For example, the order of some operations may change or some operations may be omitted, without departing from the spirit and scope of the shown embodiment. In some embodiments, operations shown in FIG. 9 may be performed in parallel or simultaneously.

At operation 910, a memory controller may determine whether a request packet corresponds to a predetermined operation device. The memory controller may include at least one of a DRAM controller and a cache controller.

At operation 920, the memory controller may determine whether an address included in the request packet corresponds to a predetermined address.

At operation 930, the memory controller may look up or otherwise obtain a tag line corresponding to the request packet.

At operation 940, the memory controller may determine whether the request packet is serviceable (e.g., in a serviceable state) based on a service bit included in the tag line. When the request packet is a consumer packet, the memory controller may determine that the service bit is in a state of being capable of reading data when the service bit has a second value. The memory controller may input the request packet into a request queue of the memory controller based on the determination that the request packet is in an unserviceable state.

The memory controller may update the tag line based on the determination that the request packet is in a serviceable state. When the request packet is a producer packet, the memory controller may update a service bit of the tag line from a first value to the second value. When the request packet is a consumer packet, the memory controller may update the service bit of the tag line from the second value to the first value.

Based on the number of producer packets being greater than or equal to a predetermined number in comparison with the number of consumer packets, the memory controller may request a producer operation device corresponding to the producer packet to reduce bandwidth. Based on the number of consumer packets being greater than or equal to a predetermined number in comparison with the number of producer packets, the memory controller may request a consumer operation device corresponding to the consumer packet to reduce bandwidth.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For ease of understanding, the description of the processing device is used as singular; however, one skilled in the art will appreciate that the processing device may include multiple processing elements and multiple types of processing elements. For example, the processing device may include multiple processors or a processor and a controller. In addition, different processing configurations are possible, such as parallel processors.

The software may include a computer program, a piece of code, an instruction, or combinations thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

Although some embodiments are described above with reference to the drawings, one of ordinary skill in the art may apply various technical modifications and variations based thereon without departing from the scope of the disclosure. Suitable results may be achieved if the described techniques are performed in a different order, and/or if components in a described system, architecture, device, or circuit are combined in a different manner, and/or replaced or supplemented by other components or their equivalents.

Therefore, other implementations, other embodiments, and equivalents to the claims are also within the scope of the disclosure, as defined by the following claims.

What is claimed is:

1. A data sharing method of a memory controller in an environment including a plurality of operation devices, the data sharing method comprising:

determining whether a request packet corresponds to a predetermined operation device;

determining whether an address included in the request packet corresponds to a predetermined address;

obtaining a tag line corresponding to the request packet, wherein the tag line comprises a service bit and at least one validity bit different from the service bit;

determining whether data corresponding to the request packet is valid based on the at least one validity bit; and determining whether the request packet is serviceable based on the service bit.

2. The data sharing method of claim 1, wherein the memory controller comprises at least one of a dynamic random-access memory (DRAM) controller and a cache controller.

3. The data sharing method of claim 1, further comprising:

based on determining that the request packet is serviceable, updating the tag line.

4. The data sharing method of claim 3, wherein the updating the tag line comprises, based on the request packet being a producer packet, updating the service bit of the tag line from a first value to a second value.

5. The data sharing method of claim 3, wherein the updating the tag line comprises, based on the request packet being a consumer packet, updating the service bit of the tag line from a second value to a first value.

6. The data sharing method of claim 1, wherein the determining whether the request packet is serviceable comprises, based on the request packet being a consumer packet and the service bit being a second value, determining that the consumer packet is capable of reading data.

7. The data sharing method of claim 1, further comprising:

adding the request packet to a request queue of the memory controller based on determining that the request packet is not serviceable.

8. The data sharing method of claim 1, further comprising:

based on a number of a plurality of producer packets being greater than or equal to a predetermined number in comparison with a number of a plurality of consumer packets, requesting a producer operation device corresponding to a producer packet from among the plurality of producer packets to reduce bandwidth.

9. The data sharing method of claim 1, further comprising:

based on a number of a plurality of consumer packets being greater than or equal to a predetermined number in comparison with a number of a plurality of producer packets, asking a consumer operation device corresponding to consumer packet from among the plurality of consumer packets to reduce bandwidth.

10. A non-transitory computer-readable storage medium storing instructions that, when executed by a processor, cause the processor to:

determine whether a request packet corresponds to a predetermined operation device;

determine whether an address included in the request packet corresponds to a predetermined address;

obtain a tag line corresponding to the request packet, wherein the tag line comprises a service bit and at least one validity bit different from the service bit;

determine whether data corresponding to the request packet is valid based on the at least one validity bit; and determine whether the request packet is serviceable based on the service bit.

11. A memory controller comprising:

a request queue configured to store a plurality of request packets;

a queue arbiter configured to determine priority information corresponding to the plurality of request packets based on at least one of producer operation device information, consumer operation device information, and address information corresponding to a shared buffer; and a tag memory configured to store a tag line comprising a service bit and at least one validity bit different from the service bit, wherein the at least one validity bit indicates whether data corresponding to a first request packet from among the plurality of request packets is valid, and wherein the service bit indicates whether the first request packet from among the plurality of request packets is serviceable.

12. The memory controller of claim 11, further comprising:

at least one of a dynamic random-access memory (DRAM) controller and a cache controller.

13. The memory controller of claim 11, further comprising:

a tag updater configured to, based on a determination that the first request packet is serviceable, update the tag line.

14. The memory controller of claim 13, wherein the tag updater is further configured to, based on the first request packet being a producer packet, update the service bit of the tag line from a first value to a second value.

15. The memory controller of claim 13, wherein the tag updater is further configured to, based on the first request packet being a consumer packet, update the service bit of the tag line from a second value to a first value.

16. The memory controller of claim 13, wherein the tag updater is further configured to, based on the first request packet being a consumer packet and the service bit being a second value, determine that the consumer packet is capable of reading data.

17. The memory controller of claim 13, wherein the tag updater is further configured to, based on a determination that the first request packet is not serviceable, input the first request packet into the request queue.

18. The memory controller of claim 13, wherein, based on a number of a plurality of producer packets being greater than or equal to a predetermined number in comparison with a number of a plurality of consumer packets, the memory controller is further configured to request a producer operation device corresponding to a producer packet from among the plurality of producer packets to reduce bandwidth.

19. The memory controller of claim 13, wherein, based on a number of a plurality of consumer packets being greater than or equal to a predetermined number in comparison with a number of a plurality of producer packets, the memory controller is further configured to request a consumer operation device corresponding to a consumer packet from among the plurality of consumer packets to reduce bandwidth.

* * * * *